(12) United States Patent
Ramezani (10) Patent No.: US 11,286,115 B2
(45) Date of Patent: Mar. 29, 2022

(54) CONVEYOR WITH EXTENDED MOTOR CONFIGURATION

(71) Applicant: Hilmot LLC, Milwaukee, WI (US)

(72) Inventor: Kamran Ramezani, La Jolla, CA (US)

( * ) Notice: Subject to any disclaimer, the term of this patent is extended or adjusted under 35 U.S.C. 154(b) by 0 days.

(21) Appl. No.: 16/991,918

(22) Filed: Aug. 12, 2020

(65) Prior Publication Data
US 2021/0047124 A1 Feb. 18, 2021

Related U.S. Application Data

(60) Provisional application No. 62/886,276, filed on Aug. 13, 2019.

(51) Int. Cl.
| | |
|---|---|
| *B65G 13/07* | (2006.01) |
| *B65G 23/22* | (2006.01) |
| *B65G 23/08* | (2006.01) |

(52) U.S. Cl.
CPC ............. *B65G 13/07* (2013.01); *B65G 23/08* (2013.01); *B65G 23/22* (2013.01); *B65G 2812/02089* (2013.01)

(58) Field of Classification Search
CPC .... B65G 47/263; B65G 47/268; B65G 13/07; B65G 13/06; B65G 23/08; B65G 23/06; B65G 23/22; B65G 2812/02089
USPC ................................ 198/781.1, 781.09, 790
See application file for complete search history.

(56) References Cited

U.S. PATENT DOCUMENTS

| | | |
|---|---|---|
| 3,674,159 A | 7/1972 | Lemelson |
| 3,696,946 A | 10/1972 | Hunter et al. |
| 3,718,248 A | 2/1973 | Muller |
| 4,168,611 A | 9/1979 | Woyton et al. |
| 4,264,002 A | 4/1981 | Van Der Schie |
| 4,266,660 A | 5/1981 | Herman |
| 4,279,337 A | 7/1981 | Kachnik |
| 4,341,334 A | 7/1982 | Bier |
| 4,375,374 A | 3/1983 | Kronseder et al. |
| 4,396,111 A | 8/1983 | Kent |
| 4,499,986 A | 2/1985 | Tsuboi et al. |
| 4,768,646 A | 9/1988 | Devins |
| 4,798,282 A | 1/1989 | Sperduti et al. |
| 4,887,707 A | 12/1989 | Harms |

(Continued)

FOREIGN PATENT DOCUMENTS

| | | |
|---|---|---|
| CN | 2234934 Y | 9/1996 |
| CN | 2234935 Y | 9/1996 |

(Continued)

OTHER PUBLICATIONS

[No Author Listed] Best Diversified Products, Inc., Best/Flex Power Expandable Conveyor With Accumulation. Product Manual, Jul. 2003, 32 pages.

(Continued)

*Primary Examiner* — James R Bidwell (74) *Attorney, Agent, or Firm* — Nutter McClennen & Fish LLP (57) ABSTRACT

The present disclosure relates to motor-driven roller operated conveyor systems and more particularly to a roller conveyor system having a transmission arrangement for driving a series of rollers from a gearless external rotor motor so that substantially uniform torque is provided to each of the rollers. Another embodiment discloses synchronizing multiple roller conveyors from a single drive motor.

9 Claims, 5 Drawing Sheets

(56) References Cited

U.S. PATENT DOCUMENTS

| | | | |
|---|---|---|---|
| 4,891,568 A | 1/1990 | Shibata et al. | |
| 4,925,005 A | 5/1990 | Keller | |
| 5,005,693 A * | 4/1991 | Fultz | B65G 47/263 198/781.06 |
| 5,042,644 A | 8/1991 | Davis | |
| 5,058,727 A | 10/1991 | Jahns et al. | |
| 5,070,995 A | 12/1991 | Schaffer et al. | |
| 5,076,420 A | 12/1991 | Kuschel | |
| 5,086,910 A | 2/1992 | Terpstra | |
| 5,150,781 A | 9/1992 | Deisenroth et al. | |
| 5,186,308 A | 2/1993 | Munro | |
| 5,224,584 A | 7/1993 | Best et al. | |
| 5,228,558 A | 7/1993 | Hall | |
| 5,285,887 A | 2/1994 | Hall | |
| 5,318,167 A | 6/1994 | Bronson et al. | |
| 5,348,140 A * | 9/1994 | Clos | B65G 13/07 198/780 |
| 5,456,347 A | 10/1995 | Best et al. | |
| 5,562,199 A | 10/1996 | Fisher | |
| 5,577,593 A | 11/1996 | Hooper | |
| 5,632,371 A | 5/1997 | Best et al. | |
| 5,862,907 A | 1/1999 | Taylor | |
| 5,906,267 A | 5/1999 | Heit et al. | |
| 5,918,728 A | 7/1999 | Syverson | |
| 6,021,888 A | 2/2000 | Itoh et al. | |
| 6,035,999 A | 3/2000 | Hall | |
| 6,206,181 B1 | 3/2001 | Syverson | |
| 6,244,427 B1 | 6/2001 | Syverson | |
| 6,288,470 B1 | 9/2001 | Breit | |
| 6,315,104 B1 | 11/2001 | Ebert | |
| 6,407,523 B1 | 6/2002 | Allan | |
| 6,445,960 B1 | 9/2002 | Borta | |
| 6,570,351 B2 | 5/2003 | Miyazaki et al. | |
| 6,710,505 B1 | 3/2004 | Barani et al. | |
| 6,729,463 B2 | 5/2004 | Pfeiffer | |
| 6,794,788 B1 | 9/2004 | Smith et al. | |
| 6,833,644 B1 | 12/2004 | Lee | |
| 6,860,381 B2 | 3/2005 | Newsom et al. | |
| 7,337,524 B2 | 3/2008 | Wolters | |
| 7,537,107 B2 * | 5/2009 | Hall | B65G 13/07 198/781.03 |
| 7,548,003 B2 | 6/2009 | Nickel-Jetter et al. | |
| 7,662,079 B2 | 2/2010 | Yamamoto et al. | |
| 7,963,388 B2 * | 6/2011 | Eubanks | B65G 13/08 198/781.1 |
| 7,987,970 B2 | 8/2011 | Schwesig | |
| 8,006,829 B2 | 8/2011 | Itoh et al. | |
| 8,307,976 B2 | 11/2012 | Kratz et al. | |
| 8,371,435 B2 * | 2/2013 | Agnoff | B65G 13/07 198/781.03 |
| 8,381,901 B2 | 2/2013 | Yamamoto | |
| 8,561,790 B2 | 10/2013 | Brayman et al. | |
| 8,757,363 B2 | 6/2014 | Combs et al. | |
| 9,004,263 B2 | 4/2015 | Hall et al. | |
| 9,156,627 B2 | 10/2015 | Mathi et al. | |
| 9,309,054 B2 | 4/2016 | Scates | |
| 9,490,738 B2 | 11/2016 | Nondahl et al. | |
| 2003/0079330 A1 | 5/2003 | Stopher et al. | |
| 2003/0141170 A1 * | 7/2003 | Yamashita | B65G 47/263 198/781.1 |
| 2005/0087428 A1 | 4/2005 | Pelak et al. | |
| 2006/0086593 A1 * | 4/2006 | Brown | B65G 43/10 198/781.1 |
| 2006/0151299 A1 | 7/2006 | Schaefer | |
| 2007/0114861 A1 | 5/2007 | Bott et al. | |
| 2008/0116041 A1 | 5/2008 | Hall | |
| 2010/0059314 A1 | 3/2010 | Haines | |
| 2010/0059341 A1 | 3/2010 | Itoh et al. | |
| 2013/0134017 A1 | 5/2013 | Hall et al. | |
| 2013/0213768 A1 | 8/2013 | Yokoya et al. | |
| 2015/0183583 A1 | 7/2015 | Specht | |
| 2016/0280465 A1 | 9/2016 | Backhaus et al. | |
| 2017/0313522 A1 | 11/2017 | Ramezani | |
| 2017/0334649 A1 | 11/2017 | Ramezani et al. | |
| 2019/0193940 A1 | 6/2019 | Ramezani et al. | |

FOREIGN PATENT DOCUMENTS

| | | |
|---|---|---|
| CN | 102026894 A | 4/2011 |
| CN | 104135111 A | 11/2014 |
| DE | 102012210099 A1 | 12/2013 |
| EP | 0 056 480 A3 | 8/1982 |
| EP | 1 086 522 A1 | 3/2001 |
| JP | H11-246016 A | 9/1999 |
| JP | 2002-087559 A | 3/2002 |
| JP | 2003-034412 A | 2/2003 |
| JP | 2003-292144 A | 10/2003 |
| JP | 2006-223013 A | 8/2006 |
| JP | 2011-140362 A | 7/2011 |
| JP | 2012-193036 A | 10/2012 |
| WO | 99/65134 A1 | 12/1999 |
| WO | 01/52386 A3 | 3/2002 |

OTHER PUBLICATIONS

Australian IP—Examination Report No. 1 for corresponding Australian Patent Application No. 2017269248, dated May 23, 2016, 2 pages.

Canadian Patent Office—Office Action pertaining to Canadian Patent Application No. 3,025,211, dated Dec. 13, 2018, 5 pages.

Chinese Patent Office—Office Action pertaining to Chinese Patent Application No. 201780039056X, dated Sep. 23, 2019, 8 pages.

European Patent Office—Search Report pertaining to European Patent Application No. 17803369.2, dated Feb. 4, 2019, 4 pages.

European Patent Office—Communication Pursuant to Article 94(3) EPC for corresponding European Patent Application No. 17803369.2, dated Feb. 21, 2019, 6 pages.

European Patent Office—European Office Action pertaining to Application No. 17803369.2-1017, dated Oct. 9, 2019, 6 pages.

International Search Report and Written Opinion for International Application No. PCT/US20/45993, dated Aug. 12, 2020 (25 pages).

Israeli Patent Office International Search Report for International Application No. PCT/US2017/033833, dated Sep. 7, 2017, together with the Written Opinion of the International Searching Authority, 11 pages.

Japanese Office Action—Application No. 2018-569180, dated Jun. 28, 2019, 9 pages.

Japanese Office Action—Application No. 2018-569180, dated Jun. 28, 2019, 9 pages (English translation).

* cited by examiner

CONVEYOR WITH EXTENDED MOTOR CONFIGURATION

PRIORITY

This patent application claims priority from provisional U.S. patent application No. 62/886,276, filed Aug. 13, 2019 entitled, "CONVEYOR WITH EXTENDED MOTOR CONFIGURATION," and naming Kamran Ramezani as inventor, the disclosure of which is incorporated herein, in its entirety, by reference.

FIELD OF THE DISCLOSURE

Various embodiments of the disclosure generally relate to roller systems and, more particularly, various embodiments of the disclosure relate to efficient and effective roller systems.

BACKGROUND OF THE DISCLOSURE

Ever more items are purchased on the Internet using online merchants, such as Amazon and eBay. These merchants often store their items in a warehouse until they are retrieved for delivery. After retrieval, the items often are moved from one region of the warehouse to another warehouse region using a roller system (also known as a "conveyer system" or "roller conveyer"). Ultimately, the items typically are loaded from the roller system onto trucks for delivery. As the world economy increasingly uses this business model, roller system efficiency, robustness, and cost become even more important.

Online merchants certainly are not the only companies that use roller systems. For example, factories, wholesalers, and others have used roller systems for years. Accordingly, their benefit and efficient use impacts an even wider swath of the economy.

As a result, it will be observed that the current disclosure would allow a single motor to drive rollers over a much longer distance than might be achieved by several zones and several motors with a substantially uniform speed synchronized with the next motor in the conveyor system.

SUMMARY

In some embodiments, a gearless external rotor motor below the conveyor rollers with ribs and associated timing belts are used as the driving mechanism, and the torque is transferred to the rollers at the top surface using O bands or a similar transmission element. Accordingly, a uniform torque distribution can be applied to a set of carrier rollers to reduce torque loss to the carrier rollers. This arrangement permits the torque to be transferred with less torque loss along the set or carrier rollers than with rollers driven from a motor by O-bands alone, and avoids complex zone control schemes.

As described herein, the same approach can also be used to synchronize two parallel conveyors.

The disclosed apparatus can also be used to refurbish existing motorized roller systems or convert a non-motorized roller system to a more reliable longer lasting gearless motorized conveyor system in an easy and cost-effective way.

BRIEF DESCRIPTION OF THE DRAWINGS

Those skilled in the art should more fully appreciate advantages of various embodiments of the disclosure from the following "Description of Illustrative Embodiments," discussed with reference to the drawings summarized immediately below.

DESCRIPTION OF ILLUSTRATIVE EMBODIMENTS

In illustrative embodiments, a conveyor system has a set of upper-level rollers and a lower-level with a motor system. Preferably, the motor system has a shaft, spaced from the motor, and carrying a pulley and drive. The drive is coupled with the motor in a substantially non-slip manner while, conversely, the pully provides torque to at least one roller on the upper-level. Note that upper and lower are just used to differentiate different levels and not intended to imply orientations or other related matters. Details of illustrative embodiments are discussed below.

Figure 1:
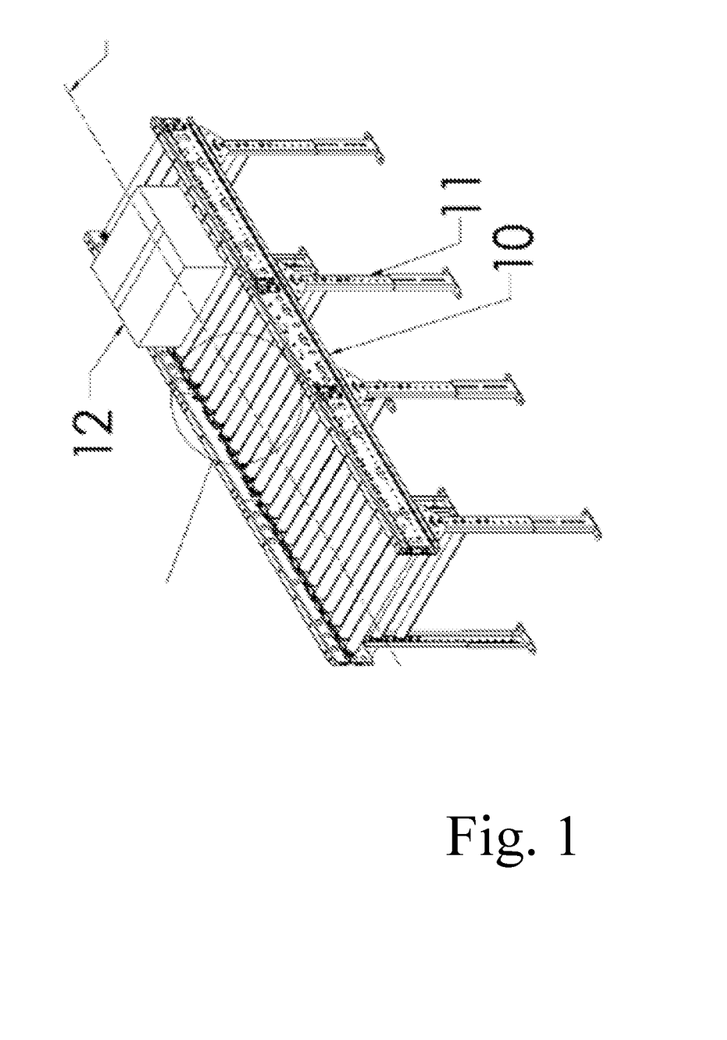
FIG. 1 schematically shows a roller system during use that may be retro-fitted and/or configured in accordance with illustrative embodiments of the disclosure.

FIG. 1 schematically shows a roller system 10 that may be configured in accordance with illustrative embodiments of the disclosure. In this example, the roller system 10 moves objects 12 along its length. For example, the objects 12 can be parcels or boxes to be shipped to an ultimate destination, such as a warehouse, store, or consumer. The roller system 10 therefore provides an automated and efficient mechanism for moving objects 12 from one area to another area. In fact, as people increasingly make online purchases, such conveyor systems have become indispensable in the Internet economy.

To those ends, the roller system 10 has frame members 9 supporting a plurality of individual rollers. Specifically, the frame members 9 may be considered to have first and second frame members 9 secured together by one or more cross-members (not shown) bolted or otherwise secured with both of the members 9. Among other materials, the frame members 9 may be formed from steel or other material that one skilled in the art may select to provide the necessary structural support.

The frame members 9 in FIG. 1 are shown as rigid members. Alternative embodiments, however, may form the frame members 9 from movable, expandable, and/or flexible materials. Such embodiments thus are configurable so that the roller system 10 can be moved or rotated in different ways to fit into a variety of configurations. For example, the frame members 9 may be formed from a lattice with a hinge at each intersection point of the lattice members. The frame members 9 may be movable and expandable. They also may be curved or angled.

FIG. 1 schematically shows optional elevation members 11 that elevate the frame above the floor. These elevation members 11 may be adjustable or fixed, i.e. not adjustable in height. Some embodiments eliminate the elevation members 11 entirely so that the frame can rest directly on the floor (e.g., to move pallets).

The rollers extend between the two frame members 9 and effectively form a roller plane (shown in FIG. 2 discussed below) along which the objects 12 move. This roller plane may be considered to have a thickness that is approximately equal to the thickness of the rollers. Such a roller plane therefore may have a top planar portion and a bottom planar portion. During use, objects 12, such as that shown in FIG. 1, traverse along the top planar portion of the roller plane. In illustrative embodiments, the motor 1, which is not within the volume of the roller plane, operates the conveyor system as described herein. In alternative embodiments, the motor 1 is partially within the extended volume of the roller plane and thus, still spaced relative to it—i.e., spaced from a portion of it. Motor 1 may be a gearless external rotor motor As discussed in greater detail below, the rollers preferably are not energized (i.e., they are non-motorized). Specifically, the rollers may be formed from a stainless steel tubular body with a belt region to receive a torqueing force via a transmission coupling (e.g., an O-band). A contiguous or non-contiguous portion of the outer surface of each roller 2 preferably is generally smooth to convey objects 12 along its length, while another portion of the outer surface, which can be contiguous or non-contiguous, may include the belt region.

Alternatively, the outer surface portion for conveying objects 12 may have some frictional surface, such as rubber pads and/or rubberized surfaces, to aid in transmitting the objects 12. Each of the rollers also may have basic internal components common in conventional rollers, such as a stationary shaft coupled with the tubular roller body by means of a pair of conventional bearings (not shown). Alternative embodiments also may intersperse one or more motorized rollers in the plane of rollers. Illustrative embodiments, however, do not require such motorized rollers in this plane Those skilled in the art will understand that the rollers may be coupled to each frame member 9 by any of a variety of conventional means. For example, the portions of the shaft at each end of the roller 2 may be threaded and thus secured to its respective frame member using a bolt (not shown). This connection enables easy replacement of malfunctioning rollers. Those portions of the shaft preferably also have structure for preventing shaft rotation. Among other ways, the portions of the shaft at each end of the roller 2 may have a cross-sectional shape, such as a hexagonal or rectangular shape, that extends through a correspondingly shaped opening in the respective frame member 9. For example, a portion of the shaft having a hexagonal cross-sectional shape may extend through a hexagonal opening through the frame member 9. The inner dimension of the hexagonal opening should be slightly larger than the outer dimension of the shaft and yet, provide a reasonably tight fit. Alternative embodiments omit the fastening device, such as the noted nut. In that case, the rollers are simply secured by their coupling with corresponding openings in the frame members 9.

The roller system 10 may be configured to move objects 12 in one direction, or in two directions. For example, one set of rollers may be configured to move objects 12 to the right from the perspective of the drawing, while another set of rollers may be configured to move objects 12 to the left from the perspective of the drawing. These rollers may be configured to move objects 12 in the respective directions at different times, or at the same time. Accordingly, such a roller system 10 has an energizing mechanism configured to move in the desired manners. As another example, the roller system 10 may be configured to move objects 12 to the left, to the right, and/or to both the left and the right. To these ends, a switch or other control mechanism (not shown) may enable the user to select one of those three modes of operation.

It should be noted that FIG. 1 shows the roller system 10 as being linear and planar. Alternative embodiments, however, may apply to roller systems 10 that are nonlinear and where three or more rollers do not necessarily form a plane. Among other things, rather than having a linear overall shape (in plan view), the roller system 10 may have an angled shape, a circular shape, an elliptical shape, a sinusoidal shape, or any other desired shape. Moreover, from a side view, the roller system 10 may take on nonplanar shapes and thus, may form a sinusoidal or other nonlinear shape. In any case, two of the rollers still may be considered to form the noted plane.

In some cases, the non-motorized rollers may not have the inherent torque to move objects 12. To provide that torque, illustrative embodiments space the motor away from the rollers, with coupling among one or more rollers to provide the noted torque. The motor 1 preferably is spaced from the rollers but within the region encompassed by the frame (the "frame region"). In the exemplary case shown, the motor 1 is spaced away from the roller plane formed by two rollers immediately adjacent to it. In other illustrative embodiments, such as that shown in FIG. 2, the motor 1 is spaced away from at least the roller 2 to which it is directly coupled.

As known in the art, the torque produced by an external rotor motor, such as motor 1, increases approximately with its diameter. This can provide a substantial benefit in high-torque applications if a larger motor is used. Undesirably, prior art designs using motorized rollers known to the inventor are generally limited to having a diameter size that generally approximates that of the other rollers. Spacing the motor 1 from the roller plane in the manner discussed above and below obviates that handicap by enabling use of a motor 1 having an appreciably larger diameter. Specifically, the diameter of the motor 1 is limited primarily by the volume of the space available for the motor 1 beneath the roller plane.

In the exemplary embodiment shown, the diameter of the motor 1 is larger than that of the rollers. In this example, the rollers may be completely within the frame region space defined by the two frame members 9. Specifically, the frame region space may be considered to be formed by the volume beneath the top of the roller plane, and bounded by the frame members 9 on the left and right sides, respectively. Accordingly, the motor 1 and rollers are between the two frame members 9. Alternatively, the motor 1 may be larger or re-positioned so that a portion of it may extend outside of the frame region space. For example, such alternative embodiments may position the motor 1 to at least partly extend outside of the frame region space. Accordingly, the motor 1 can have a diameter that is the same as, smaller, or larger than the diameters of the rollers.

In addition to enabling use of a wider variety of motors 1 (e.g., a larger motor 1 for more torque, or a smaller motor 1 for less torque), illustrative embodiments also permit the motor 1 to be replaced more easily due to its placement away from the roller plane and its removable connection. This design further favorably eliminates damaging cantilevering forces inherent in prior art designs known to the inventor.

Specifically, motors having an internal rotor typically extend their rotors from the main body of the motor and position a transmission coupling from that protruding portion. This produces a cantilevering force to the motor that can eventually break down the motor more rapidly. Illustrative embodiments avoid that cantilevering problem by positioning the transmission coupling along the main portion of the motor 1. The structure of the motor 1 enables such a beneficial result. A more detailed description of the design of illustrative embodiments of the motor 1 highlights this benefit.

Figure 2:
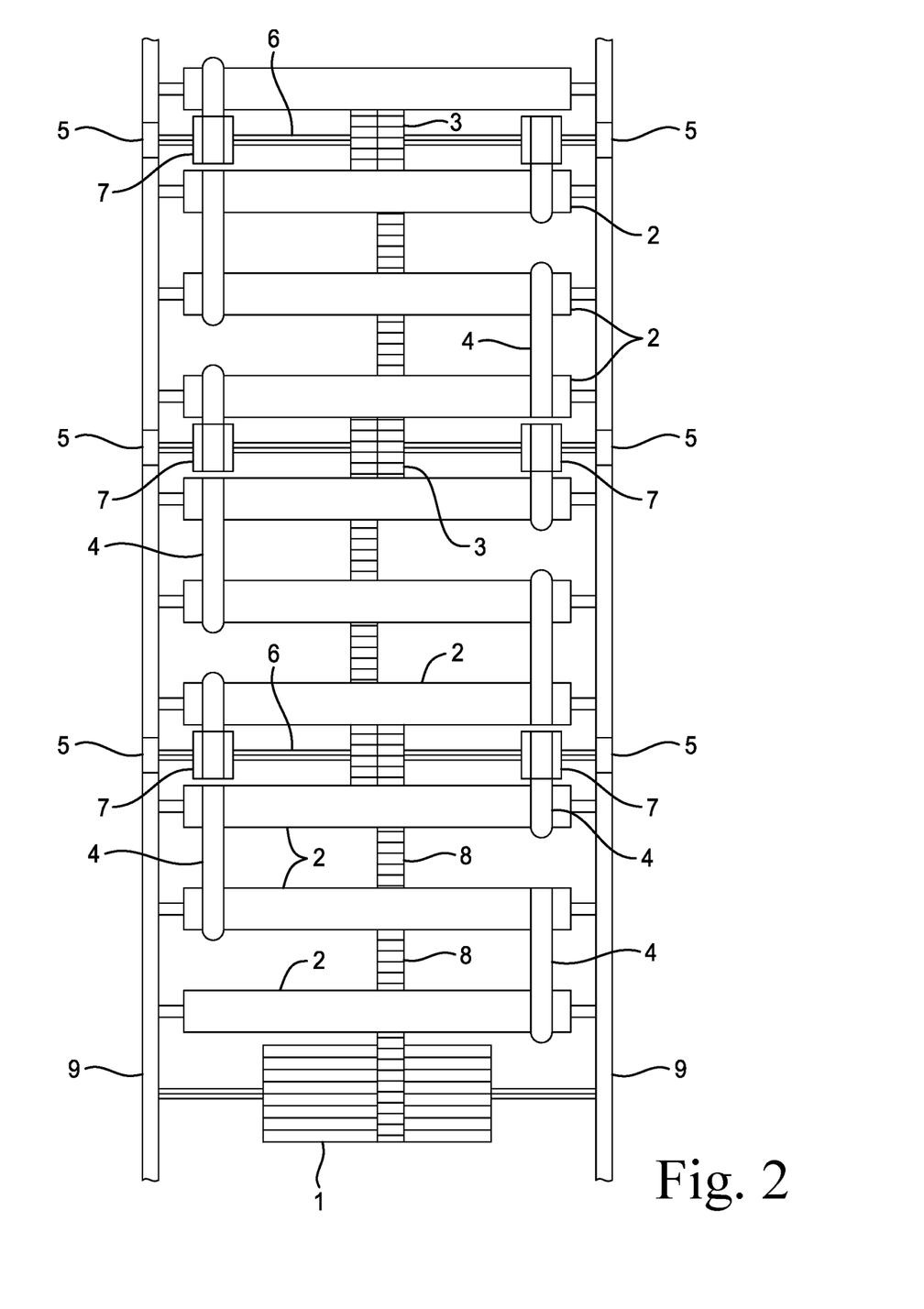
FIG. 2 schematically shows a top view of a conveyor system configured in accordance with a first embodiment of the disclosure.

In preferred embodiments, the external rotor motor 1 of FIG. 2 has an outer, generally tubular rotor body having a circular or elliptically shaped cross section at one or more locations along the axis of the motor. The rotor body can be formed in a variety of manners, such as by machining a solid metal tube, from rolled metal, or by other means. As suggested above, this tubular rotor body effectively forms the rotor of the motor 1. Also as shown, the belt region of this design can use two different types of transmission couplings. Specifically, the belt region may have a first portion that accepts O-ring belts, and/or a second, non-contiguous portion that can accept Poly-V belts.

The motor 1 also has a stationary portion or stator that cooperates with the rotor to cause the rotor to rotate. The rotor therefore is positioned radially outward relative to the stationary portion and partly or completely circumscribes the stationary portion (i.e., it partly or completely circumscribes the stator).

As such, in illustrative embodiments, the motor 1 preferably is a brushless, DC motor. It may have gears or be gearless. To that end, the stationary portion has the above noted stator (formed by a plurality of windings) that extends around a portion of the stationary shaft. A printed circuit board near the windings controls commutation of the motor 1. For example, the printed circuit board may have magnetic sensors (e.g., Hall sensors) to detect movement of the rotor. Other embodiments may have other circuitry or mechanisms to detect rotor movement, and/or may position the commutation circuitry/printed circuit board outside of the motor housing/rotor. Part or all of the shaft may form a hollow bore to permit wiring to couple with the printed circuit board and the stator. That wiring may include control wires to transmit magnetic signals, energizing wires to energize the electromagnet formed by the stator, and wires for other functions. Alternative embodiments may position some of the commutation circuit outside of the motor 1 (i.e., an external controller).

To interact with the stator for commutation, the rotor has a permanent magnet secured to its internal surface. In illustrative embodiments, the magnet includes a ring magnet or similar magnet. For example, the magnet may include a hot pressed, sintered magnet of high purity. Such a magnet is formed primarily of magnetic material and coupling media. A minimal amount of fillers preferably is used. The commutation circuitry therefore detects rotation of the magnet of the rotor to energize the overall motor 1. To rotatably couple the rotor about the stationary portion, the motor 1 also has a first bearing and a second bearing. A clip at each end may secure the bearings to the shaft.

In alternative embodiments, however, the motor 1 may include another type of external rotor motor, or an internal rotor design. The motor 1 may be cantilevered or not cantilevered.

Figure 3:
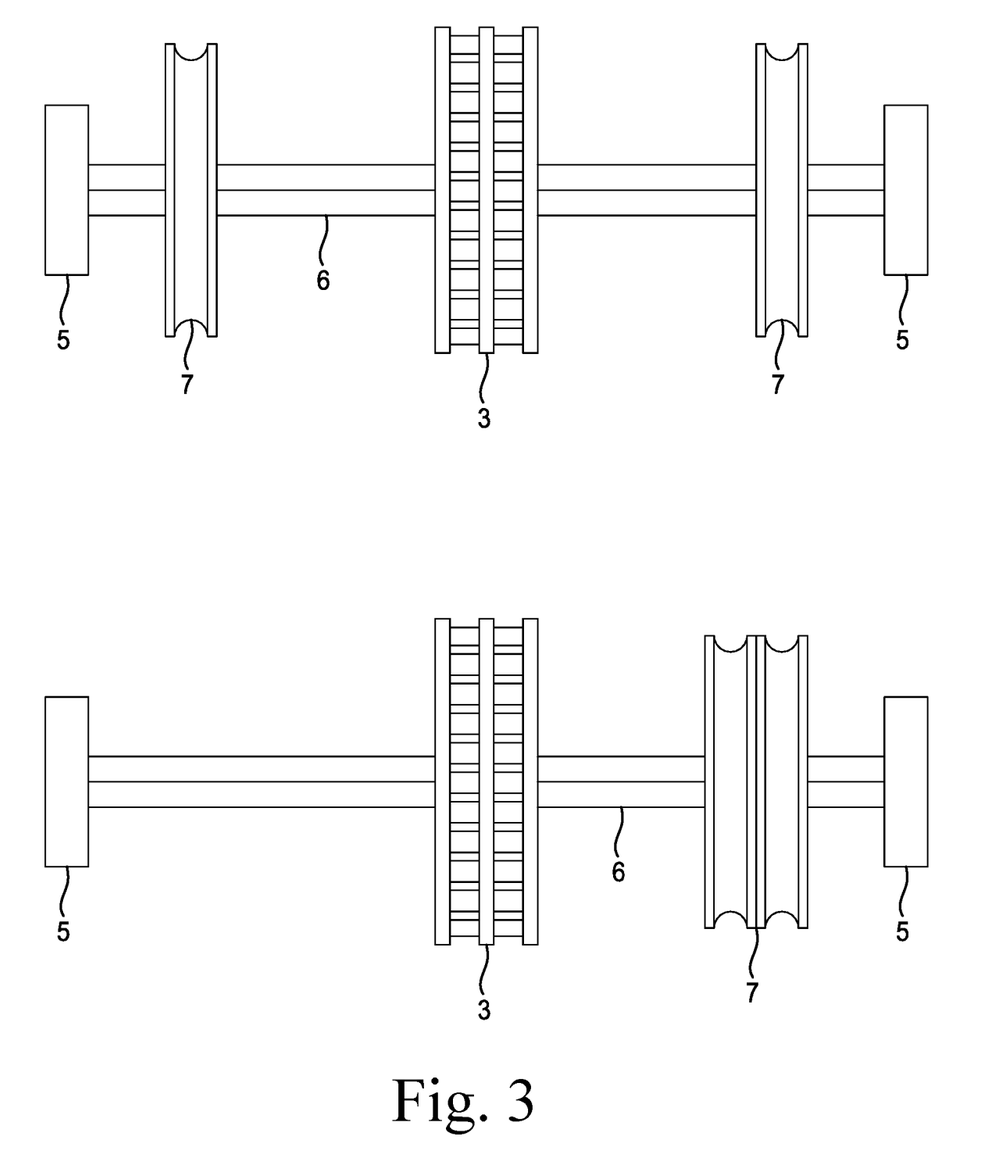
FIG. 3 schematically shows two types of pully assemblies that may be used in illustrative embodiments of the disclosure.

FIG. 2 schematically shows a top view of a conveyor system configured in accordance with a first embodiment of the disclosure. As shown the frame members 9 form the interior region containing the rollers 2 on the top, roller plane, and the motor 1 and its transmission system on a lower plane. The transmission system includes a plurality of pully and shaft assemblies spaced from the roller plane. Each pully and shaft assembly ("pulley assembly") may include a shaft 6 (preferably having a cross-sectional shape) supporting one or more pulleys 7 and drives 3. As shown in FIG. 3, the pulley assembly preferably includes a primary drive 3 with features (e.g., teeth) for receiving a non-slip transmission belt, and a pulley 7 with features configured for receiving a transmission belt. This embodiment also includes a pair of bearings 5 rotationally coupling the shaft to the frame members 9.

In preferred embodiments, a non-slip transmission coupling 4 transmits torque from the motor 1 to its nearest pulley assembly/assemblies. For example, that transmission coupling may be a transmission belt with teeth that mate with teeth formed by the primary drive 3. In a corresponding manner, the primary drive also may have a nearby additional surface or other primary drive 3 that couples with a downstream primary drive 3 of another pulley assembly having a similar structure. As shown in FIG. 3, the primary drive sprocket 3 may be a single member with two areas for coupling with two separate corresponding transmission belts. The pulleys 7 may be on either side of the primary drive(s) 3, or on one side. Those skilled in the art may position them as a function of the adjacent rollers and other components in the system. Preferably, the pulleys 7 and drives 3 may be axially movable along the shaft 6 to couple in a desired location. For example, each such pulley 7 and drive 3 may have a fastening mechanism that can be loosened and tightened for movement along the shaft 6.

Accordingly, as shown in FIG. 2, the motor 1 and a series of transmission belts 8 may provide torque to a series of pulley assemblies spaced from the roller plane. Illustrative embodiments transmit this system of torque to rollers 2 in the roller plane via a plurality of transmission couplings 4.

More specifically, in this example, using transmission couplings, the torque applied to the shafts 6 delivers its torque to out of plane rollers 2. The system can arrange these couplings 4 in any of a variety of different patterns, such as that shown in FIG. 2. Those skilled in the art may select any of a wide variety of different types of transmission couplings. That selection may depend on a wide variety of factors, such as cost, effectiveness, intended use and specifications of the roller system. For example, for a better grip, the transmission couplings 4 may be the so-called "Poly-V" type, which forms a series of V-shaped ridges that mate with corresponding V-shaped grooves in the belt region of the roller. Other embodiments may use so-called "O-ring" transmission couplings 4, which have generally smooth outer surfaces.

Accordingly, the transmission couplings 4 may include a band, a flex coupling, a chain, and a timing belt, and these couplings may be made from any of a variety of single or composite materials, such vinyl, rubber, and/or metal.

In fact, while preferred embodiments use the same type of transmission couplings 4 for a given roller system, alternative embodiments may use different types of transmission couplings 4 for a single roller system.

The roller system thus has a plurality of additional transmission couplings 4 coupled between other adjacent rollers. Accordingly, the rollers transmit that same torque to their adjacent rollers, which proceed to transmit that same torque to other adjacent rollers. Thus, during use, the motor 1 transmits torque from its rotor, to the pully assembly, to a first roller, and then to other downstream and/or upstream rollers. This can be repeated in a plurality of different regions that each includes a pulley assembly coupled with adjacent in-plane pulley assembly/assemblies, and one or more out-of-plane rollers in the roller plane.

Figure 4:
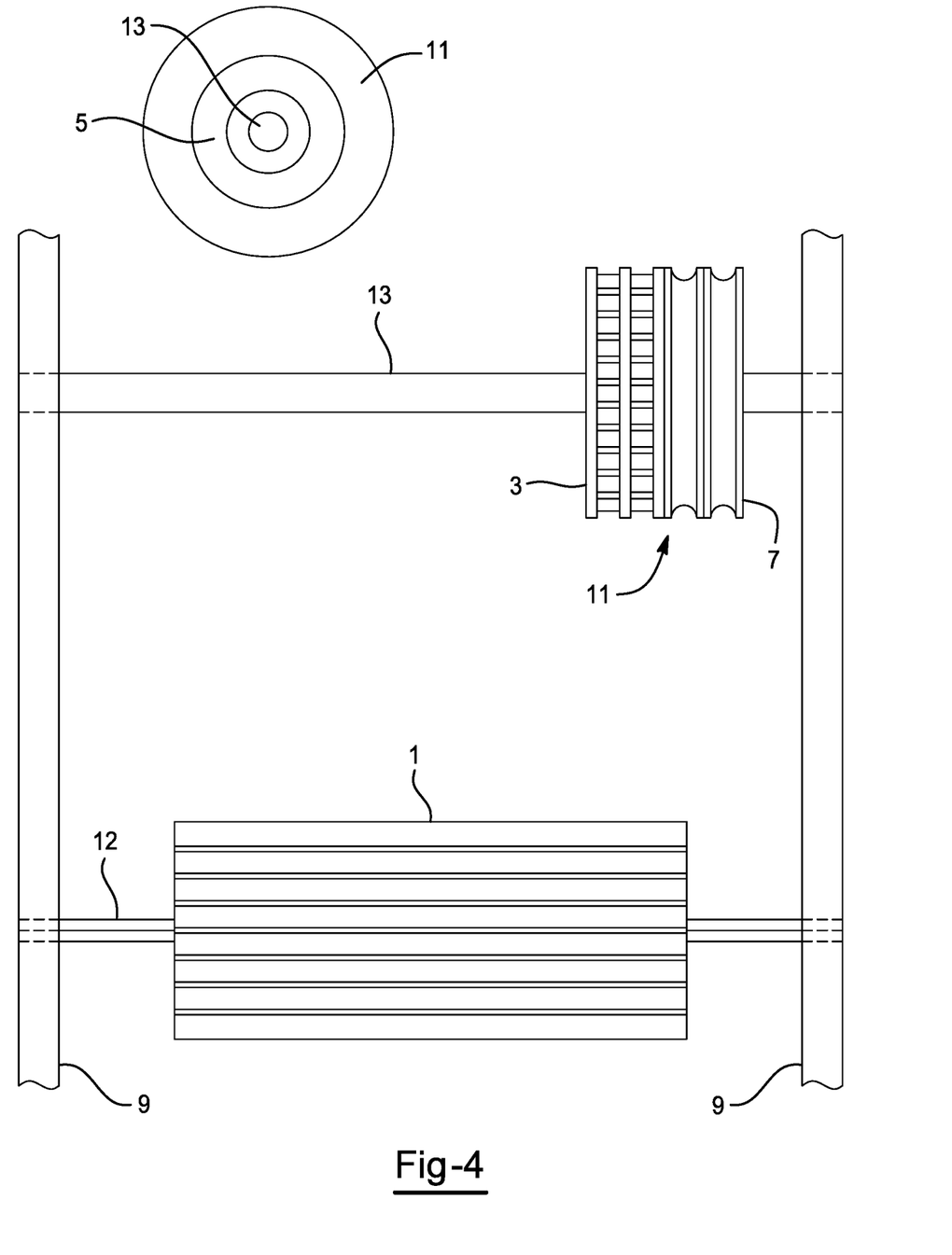
FIG. 4 schematically shows another type of pully assembly that may be used in illustrative embodiments of the disclosure.

FIG. 4 schematically shows another example of a pulley assembly and motor. In this embodiment, the pulley 7 is integral with the primary drive 3—they form one unit that has a uniform rotational speed when receiving a torque. This embodiment therefore may mount the drive 3 and pulley 7 device on one or more bearings and keep the shaft stationary in this example (the shaft is identified this time using reference number "13"). Other embodiments may use this similar arrangement with the rotating shaft and thus, not use the bearings to couple with the shaft 13.

Illustrative embodiments may use different arrangements for transmitting torque. Some embodiments share torque among different conveyor systems.

Figure 5:
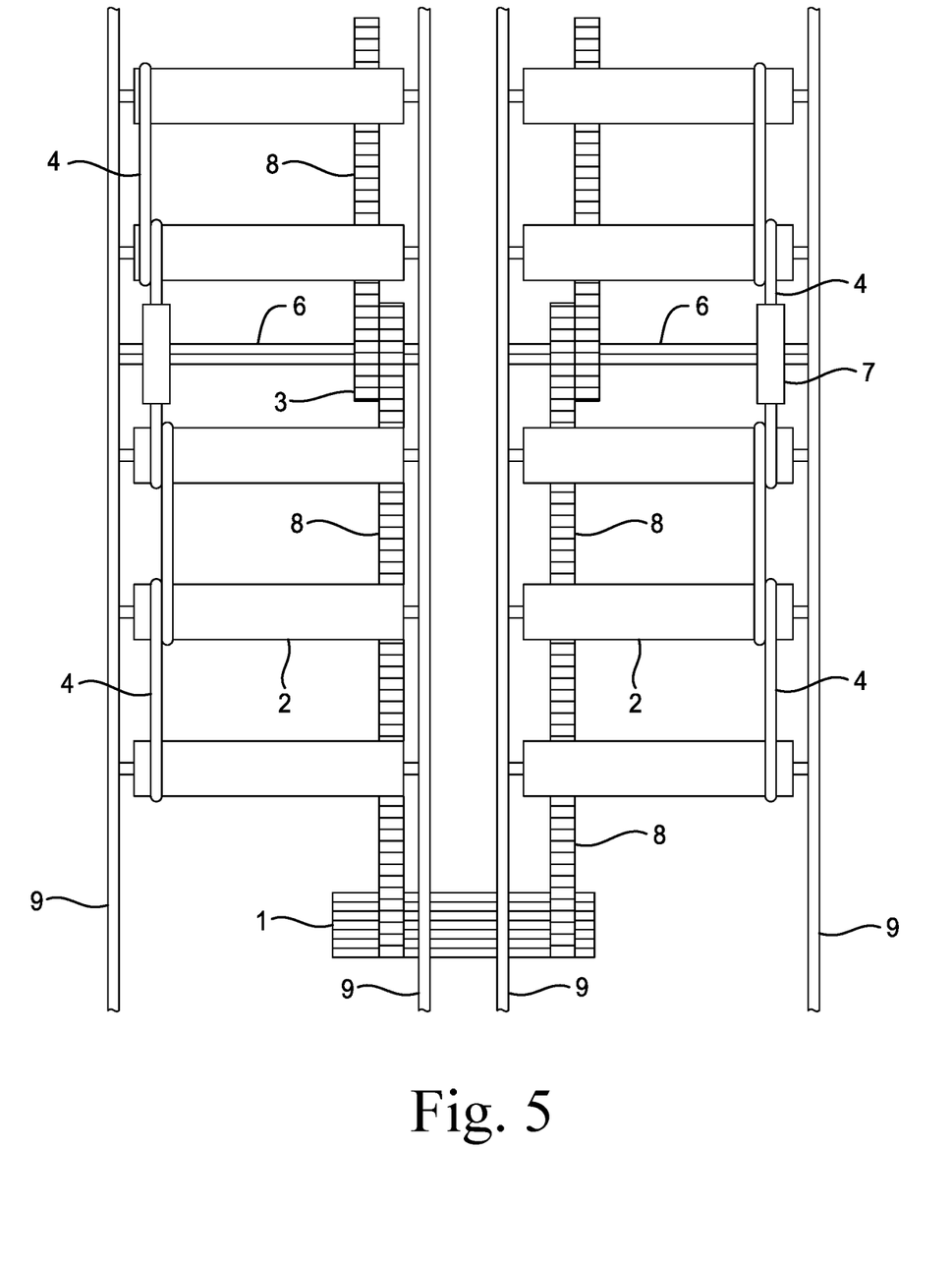
FIG. 5 schematically shows a top view of another conveyor system configured in accordance with a second embodiment of the disclosure.

FIG. 5, for example, schematically shows a top view of another conveyor system configured in accordance with a second embodiment of the disclosure. In this embodiment, a single motor 1 transmits torque to a plurality of pulley systems on different conveyors. The left conveyor may have a plurality of additional pulley assemblies not shown, and the right conveyor may have a plurality of additional pully assemblies not shown.

Among other benefits, illustrative embodiments may be used to retrofit non-motorized conveyor systems more easily since the power and transmission portion is in a different plane than that of the roller plane. In other words, the spacing of the overall motorized portion in another plane makes retrofitting less complex. Moreover, illustrative embodiments may be used to improve existing motorized conveyor systems (e.g., replacing and/or augmenting the old motors). As such, various embodiments relate to a method of retrofitting existing roller/conveyor systems to produce the motor system in a different plane than that of the rollers.

The embodiments of the disclosure described above are intended to be merely exemplary; numerous variations and modifications will be apparent to those skilled in the art. Such variations and modifications are intended to be within the scope of the present disclosure as defined by any the appended claims.

I claim:

1. A roller conveyor system comprising:
a frame;
a top level of rollers having first and second rotatable rollers;
a lower level having a gearless external rotor motor having a ribbed outer surface;
at least one first lower level shaft having a first motor drive pulley attached to the shaft for causing rotation of the shaft upon rotation of the first motor drive pulley;
a timing belt operatively connected between the ribbed surface of the motor and the first motor drive pulley for driving the pulley from the motor;
an O-band pulley attached to the first lower level shaft so as to rotate with the shaft;
an O-band operatively connected between the O-band pulley and a first roller for causing rotation of the first roller upon rotation of the O-band pulley.

2. The conveyor system of claim 1 including
a second lower level shaft having a second drive pulley attached to the shaft for causing rotation of the shaft upon rotation of the second drive pulley;
a third drive pulley attached to the first lower level shaft so as to rotate with the first lower level shaft;
a timing belt operatively connected between the second and third drive pulleys for causing rotation of the third drive pulley upon rotation of the second drive pulley;
a second O-band pulley attached to the second lower level shaft so as to rotate with the second lower level shaft; and
an O-band operatively connected between the second O-band pulley and a second roller for causing rotation of the second roller upon rotation of the second O-band pulley.

3. The conveyor system of claim 1 wherein the motor drive pulley and the O-band pulley are moveable along their respective shafts.

4. The conveyor system of claim 1 wherein the motor drive pulley and the O-band pulley are attached to each other and rotate independently of the shaft they are mounted on.

5. The conveyor system of claim 1 including a second roller and a transmission for driving the second roller from the first roller.

6. The conveyor system of claim 4 wherein the transmission is an O-band.

7. The conveyor system of claim 2 wherein the rollers include a third roller and wherein the second roller drives the third roller.

8. The conveyor system of claim 2 wherein the rollers include a third roller, and wherein the first and second rollers both drive a third roller.

9. The conveyor system of claim 2 wherein the rollers include a third roller, and wherein the first, second and third rollers rotate at substantially the same speed.

\* \* \* \* \*